March 25, 1969  R. O. ENGH  3,435,225
ULTRAVIOLET SENSITIVE GEIGER TUBE OPERATING CIRCUIT
WITH REVERSE QUENCH VOLTAGE
Filed Dec. 27, 1965

INVENTOR.
ROBERT O. ENGH
BY Oliver F. Anett
ATTORNEY

United States Patent Office 3,435,225
Patented Mar. 25, 1969

3,435,225
ULTRAVIOLET SENSITIVE GEIGER TUBE OPERATING CIRCUIT WITH REVERSE QUENCH VOLTAGE
Robert O. Engh, Hopkins, Minn., assignor to Honeywell Inc., Minneapolis, Minn., a corporation of Delaware
Filed Dec. 27, 1965, Ser. No. 516,585
Int. Cl. G01t 1/18
U.S. Cl. 250—83.6               6 Claims

ABSTRACT OF THE DISCLOSURE

An AC operating circuit in combination with an ultraviolet sensitive Geiger tube is disclosed. The AC circuit includes a diode and two resistors arranged to provide an operating voltage to the Geiger tube during first half cycles and a relatively low quenching voltage to it during opposite half cycles, which quenching voltage provides a clearing field within the tube for de-ionizing the gas fill.

---

Figure 1:
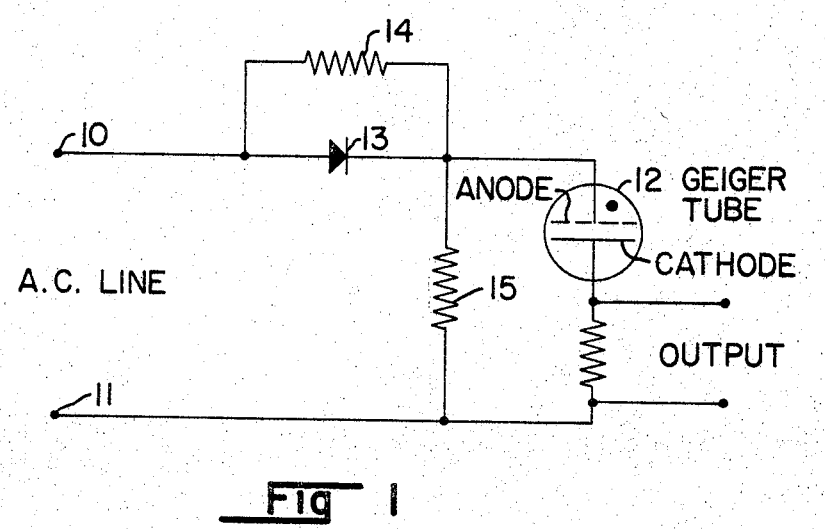

This invention relates to ultraviolet detector systems utilizing detector tubes of the Geiger-Mülleur type, hereinafter referred to as "Geiger tubes." More particularly, this invention relates to improved operating circuits for such Geiger tubes.

By "Geiger tube" is meant an ultraviolet detector tube having an anode and a cathode disposed in an ionizable gas, which, upon being subjected to a condition to which it is sensitive, causes an electron to be present within the electric field established by the anode and cathode, whereupon the electron accelerates towards the anode, ionizing the gas, and causing a discharge current to flow, which current must be subsequently quenched.

In order for a Geiger tube to properly indicate that it is experiencing an ionizing event, such as the receipt of ultraviolet radiation, it is necessary that the tube be subjected to an applied potential of a value known in the art as the "striking potential," "firing potential," or "breakdown potential." The term utilized hereinafter to describe this potential value will be "breakdown potential."

It has become understood in the art that beneficial results are obtained when the Geiger tube is operated in an AC circuit because then the tube is quenched automatically at the end of each half-wave pulse of applied AC. Thus, when the tube is subjected to sufficient incident photon radiation it will discharge during each first half-cycle of applied potential as soon as the potential reaches a forward breakdown potential. Subsequently, if the tube is subjected to sufficient incident radiation, it will also discharge during each opposite half cycle of applied potential as soon as the potential reaches a reverse breakdown potential. During these half-cycles, the discharge continues until the applied potential falls below a sustaining value. Therefore, each discharge is quenched by the drop in the applied potential at the end of each AC half-cycle.

Thus it can be seen that AC operation provides automatic quenching of the tube discharge at the end of each half-cycle by reversal of applied potential. However, it has been found that when a Geiger tube is discharged, it is not always completely quenched at the end of each half-cycle. If it should happen that the gas fill of the tube is still slightly ionized when the AC swings into its opposite half-cycle to provide a clearing field, the tube will tend to discharge without actually sensing radiation and spurious counts will result.

In accordance with the present invention there is provided a novel circuit arrangement for use with Geiger tubes which avoids this common source of spurious counts. This invention provides a solution to this problem by providing an operating circuit for use with Geiger tubes which allows the forward breakdown potential to be reached or exceeded during each first half-cycle of AC but which limits the applied potential of succeeding opposite half-cycles of AC to a value below the reverse breakdown potential. There is thus provided a limited reverse clearing field during the opposite half-cycles of AC which tends to collect any ionized particles in the gas fill onto the electrodes and prepare the tube for discharge during succeeding first half-cycles. It is of particular importance that this reverse clearing field does not reach the reverse breakdown potential. If discharge occurs during the first half-cycles it will be indicative of an actual ionizing event, i.e., the receipt of radiation rather than a spurious discharge.

Figure 2:
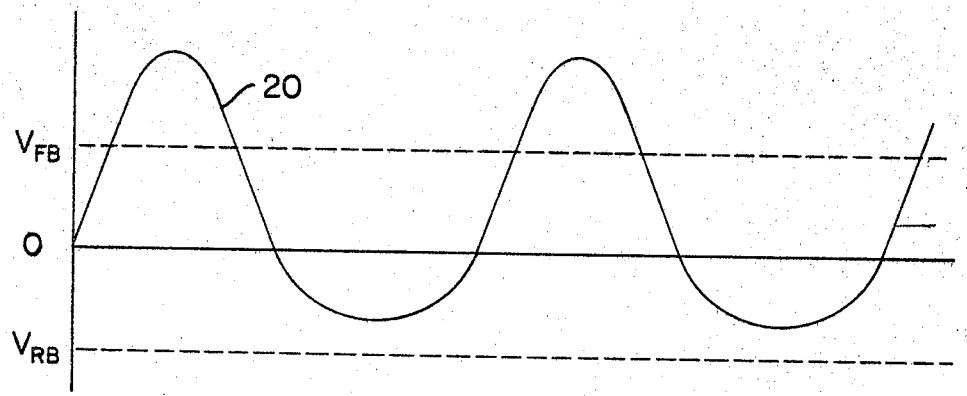

In the description of the invention reference is made to the accompanying drawing, of which:

FIGURE 1 is a schematic circuit diagram of a circuit according to the invention for operating a Geiger tube from an AC source, and FIGURE 2 is a graph showing the potential applied to the Geiger tube of FIGURE 1.

The UV detector system shown in FIGURE 1 is typically operated from a source of AC line voltage which may be of the 60 cycle 110 volt variety and is adapted to be connected thereto by terminals 10 and 11. The circuit means connected between terminals 10 and 11 comprises: the anode and cathode of Geiger tube 12, which are connected in series circuit with an asymmetrical current conductive means 13 and an output means such as a load resistor designated Output. Also included in the circuit are bidirectional impedance means 14 and 15.

More specifically, asymmetrical current conductive means 13 may consist of a diode, and a bidirectional impedance means 14 and 15 may consist of eletcrical resistors.

Geiger tube 12 includes a cathode electrode and an anode electrode which are disposed in an ionizable gaseous medium contained within an envelope. Geiger tube 12 is constructed and arranged to be sensitive to a given radiation, for example ultraviolet radiation. The presence of this radiation causes the gas medium within the Geiger tube to ionize such that the Geiger tube becomes current conductive from the anode to the cathode.

As can be seen in FIGURE 1, the anode of Geiger tube 12 is connected to the cathode of diode 13. Thus, Geiger tube 12 and diode 13 are poled so as to conduct current only during first given half-cycles of AC.

Considering the operation of this invention, as when the Geiger tube is subjected to radiation, during the first half-cycle in which terminal 10 is positive, current flows through a diode 13 and resistor 15 unless the Geiger tube 12 has experienced an ionizing event, in which case current would flow in the form of a discharge between the anode and cathode of Geiger tube 12. Reference is made to FIGURE 2 wherein the applied potential is represented by curve 20.

From a study of curve 20 it can be seen that Geiger tube 12 will discharge when the positive AC pulse reaches or exceeds the forward breakdown potential ($V_{FB}$) if the Geiger tube experiences an ionizing event.

During the succeeding opposite half-cycle when terminal 11 is positive, current flows through resistor 15 and resistor 14 thus dividing the voltage applied across the anode and cathode of Geiger tube 12 and also effectively shunting diode 13.

This arrangement as shown in the curve of FIGURE 2, limits the potential applied to the Geiger tube during each opposite half-cycle to a value below the reverse breakdown potential ($V_{RB}$).

Thus, Geiger tube 12 operates in a detecting mode for the first half-cycles and in a quenching mode for opposite half-cycles of AC. During the detecting mode, Geiger tube 12 is operated in a normal fashion and the potential applied thereto is of a value which reaches or exceeds its forward breakdown potential. During the quenching mode, diode 13 is shunted by resistor 14 and Geiger tube 12 is shunted by resistor 15 thus limiting the potential applied to Geiger tube 12 to a value below the reverse breakdown potential. At these low values, if any ionized species remain in the gas fill from previous discharges, they are collected on the anode and cathode and are not available to initiate spurious discharge.

What is claimed is:

1. A Geiger tube circuit comprising:
   a Geiger tube having a forward breakdown potential and a reverse breakdown potential;
   a pair of terminals adapted to be connected to an AC source having a peak value exceeding said forward breakdown potential;
   first circuit means serially connecting said terminals and said Geiger tube and including an asymmetrical current conductive means which is poled to conduct current on said first half cycles to apply a forward potential to said Geiger tube which exceeds said forward breakdown potential during first half cycles of the AC source; and
   second circuit means serially connecting said terminals and said Geiger tube and including means to apply a reverse potential, which is less than said reverse breakdown potential, to said Geiger tube during the opposite half cycles of the AC source for providing a clearing field within the tube.

2. The Geiger tube circuit of claim 1 wherein said second electrical circuit includes bidirectional impedance means connected in parallel with said Geiger tube and said asymmetrical current conductive means.

3. The Geiger tube circuit of claim 2 wherein said asymmetrical current conductive means is a diode and said bidirectional impedance means is a first electrical resistor in parallel with said Geiger tube and a second electrical resistor in parallel with said current conductive means.

4. The Geiger tube circuit of claim 1 wherein said second circuit means includes potential dividing means having said Geiger tube connected across a portion thereof.

5. The Geiger tube circuit of claim 1 wherein:
   said first electrical circuit means includes a unidirectional current conductive means; and
   said second circuit means includes first bidirectional impedance means connected in parallel with said unidirectional current conductive means and second bidirectional impedance means connected in parallel with said Geiger tube, the impedance values of said first and second impedance means being such that the reverse potential applied to said Geiger tube is limited to a value which is below said reverse breakdown potential.

6. The Geiger tube circuit of claim 5 wherein:
   said unidirectional current conductive means is a diode; and
   said first and second bidirectional impedance means are electrical resistors.

References Cited

UNITED STATES PATENTS 3,015,767   1/1962   Taylor _____ 307—107 X

RALPH G. NILSON, *Primary Examiner.*

SAUL ELBAUM, *Assistant Examiner.*

U.S. Cl. X.R.

313—93; 307—107